(12) United States Patent
Kelley et al.

(10) Patent No.: US 8,636,944 B2
(45) Date of Patent: *Jan. 28, 2014

(54) METHOD OF MAKING PLASTIC CONTAINER HAVING A DEEP-INSET BASE

(75) Inventors: Paul V. Kelley, Wrightsville, PA (US); Scott E. Bysick, Elizabethtown, PA (US); Brian A. Lynch, Merrimack, NH (US); Thomas E. Nahill, Amherst, NH (US); Romuald Philippe, York, PA (US)

(73) Assignee: Graham Packaging Company L.P., York, PA (US)

( * ) Notice: Subject to any disclaimer, the term of this patent is extended or adjusted under 35 U.S.C. 154(b) by 556 days.

This patent is subject to a terminal disclaimer.

(21) Appl. No.: 12/329,899

(22) Filed: Dec. 8, 2008

(65) Prior Publication Data

US 2010/0140838 A1    Jun. 10, 2010

(51) Int. Cl.
- *B29C 39/02* (2006.01)
- *B29C 43/02* (2006.01)
- *B65D 90/12* (2006.01)

(52) U.S. Cl.
USPC .......................... 264/534; 264/523; 264/531

(58) Field of Classification Search
USPC ................. 264/531, 534, 523, 526, 528, 532; 215/373, 374, 376, 377
See application file for complete search history.

(56) References Cited

U.S. PATENT DOCUMENTS

| | | |
|---|---|---|
| 1,499,239 A | 6/1924 | Malmquist |
| 2,142,257 A | 1/1937 | Saeta |
| D110,624 S | 7/1938 | Mekeel, Jr. |
| 2,124,959 A | 7/1938 | Vogel |
| 2,378,324 A | 6/1945 | Ray at al. |
| 2,880,902 A | 4/1959 | Owsen |
| 2,960,248 A | 11/1960 | Kuhlman |
| 2,971,671 A | 2/1961 | Shakman |
| 2,982,440 A | 5/1961 | Harrison |
| 3,043,461 A | 7/1962 | Glassco |
| 3,081,002 A | 3/1963 | Tauschinski at al. |
| 3,090,478 A | 5/1963 | Stanley |
| 3,142,371 A | 7/1964 | Rice et al. |
| 3,174,655 A | 3/1965 | Hurschman |

(Continued)

FOREIGN PATENT DOCUMENTS

| | | |
|---|---|---|
| AU | 2002257159 B2 | 4/2003 |
| CA | 2077717 A1 | 3/1993 |

(Continued)

OTHER PUBLICATIONS

International Search Report dated Apr. 21, 2010 from corresponding PCT/US2009/066191 filed Dec. 1, 2009.

(Continued)

*Primary Examiner* — Atul P. Khare
(74) *Attorney, Agent, or Firm* — Baker Botts L.L.P.

(57) ABSTRACT

A method of plastic container having a deep inset base of the type that has a standing ring for supporting the container on a flat surface includes steps of molding a container blank having a standing ring and a base projection portion that is formed beneath the standing ring and relatively displacing the base projection portion upwardly with respect to the standing ring until the base projection portion is positioned above the standing ring. An improved plastic container having a deep inset base is also disclosed.

13 Claims, 7 Drawing Sheets

(56) References Cited

U.S. PATENT DOCUMENTS

| | | | |
|---|---|---|---|
| 3,198,861 A | 8/1965 | Marvel | |
| 3,301,293 A | 1/1967 | Santelli | |
| 3,325,031 A | 6/1967 | Singier | |
| 3,397,724 A | 8/1968 | Bolen at al. | |
| 3,409,167 A | 11/1968 | Blanchard | |
| 3,417,893 A | 12/1968 | Lieberman | |
| 3,426,939 A | 2/1969 | Young | |
| 3,468,443 A | 9/1969 | Marcus | |
| 3,483,908 A | 12/1969 | Donovan | |
| 3,485,355 A | 12/1969 | Stewart | |
| 3,693,828 A | 9/1972 | Kneusel et al. | |
| 3,704,140 A | 11/1972 | Petit et al. | |
| 3,727,783 A | 4/1973 | Carmichael | |
| 3,819,789 A | 6/1974 | Parker | |
| 3,904,069 A | 9/1975 | Toukmanian | |
| 3,918,920 A | 11/1975 | Barber | |
| 3,935,955 A | 2/1976 | Das | |
| 3,941,237 A | 3/1976 | MacGregor, Jr. | |
| 3,942,673 A | 3/1976 | Lyu et al. | |
| 3,949,033 A | 4/1976 | Uhlig | |
| 3,956,441 A | 5/1976 | Uhlig | |
| 4,035,455 A * | 7/1977 | Rosenkranz et al. | 264/40.3 |
| 4,036,926 A | 7/1977 | Chang | |
| 4,037,752 A | 7/1977 | Dulmaine et al. | |
| 4,117,062 A | 9/1978 | Uhlig | |
| 4,123,217 A | 10/1978 | Fischer et al. | |
| 4,125,632 A | 11/1978 | Vosti et al. | |
| 4,134,510 A | 1/1979 | Chang | |
| 4,158,624 A | 6/1979 | Ford et al. | |
| 4,170,622 A | 10/1979 | Uhlig | |
| 4,170,662 A | 10/1979 | Weiss et al. | |
| 4,174,782 A | 11/1979 | Obsomer | |
| 4,177,239 A * | 12/1979 | Gittner et al. | 264/530 |
| 4,219,137 A | 8/1980 | Hutchens | |
| 4,231,483 A | 11/1980 | Dechenne et al. | |
| 4,247,012 A | 1/1981 | Alberghini | |
| 4,301,933 A | 11/1981 | Yoshino et al. | |
| 4,318,489 A | 3/1982 | Snyder et al. | |
| 4,318,882 A | 3/1982 | Agrawal et al. | |
| 4,338,765 A | 7/1982 | Ohmori et al. | |
| 4,355,728 A | 10/1982 | Ota et al. | |
| 4,377,191 A | 3/1983 | Yamaguchi | |
| 4,378,328 A | 3/1983 | Przytulla et al. | |
| 4,381,061 A | 4/1983 | Cerny et al. | |
| D269,158 S | 5/1983 | Gaunt et al. | |
| 4,386,701 A | 6/1983 | Galer | |
| 4,436,216 A | 3/1984 | Chang | |
| 4,444,308 A | 4/1984 | MacEwen | |
| 4,450,878 A | 5/1984 | Takada et al. | |
| 4,465,199 A * | 8/1984 | Aoki | 215/373 |
| 4,497,855 A | 2/1985 | Agrawal et al. | |
| 4,525,401 A | 6/1985 | Pocock et al. | |
| 4,542,029 A | 9/1985 | Caner et al. | |
| 4,585,158 A | 4/1986 | Wardlaw, III | |
| 4,610,366 A | 9/1986 | Estes et al. | |
| 4,628,669 A | 12/1986 | Herron et al. | |
| 4,642,968 A | 2/1987 | McHenry et al. | |
| 4,645,078 A | 2/1987 | Reyner | |
| 4,667,454 A | 5/1987 | McHenry et al. | |
| 4,684,025 A | 8/1987 | Copland et al. | |
| 4,685,273 A | 8/1987 | Caner et al. | |
| D292,378 S | 10/1987 | Brandt et al. | |
| 4,723,661 A | 2/1988 | Hoppmann et al. | |
| 4,724,855 A | 2/1988 | Jackson et al. | |
| 4,725,464 A | 2/1988 | Collette | |
| 4,747,507 A | 5/1988 | Fitzgerald et al. | |
| 4,749,092 A | 6/1988 | Sugiura et al. | |
| 4,769,206 A | 9/1988 | Reymann et al. | |
| 4,773,458 A | 9/1988 | Touzani | |
| 4,785,949 A | 11/1988 | Krishnakumar et al. | |
| 4,785,950 A | 11/1988 | Miller et al. | |
| 4,807,424 A | 2/1989 | Robinson et al. | |
| 4,813,556 A | 3/1989 | Lawrence | |
| 4,831,050 A | 5/1989 | Cassidy et al. | |
| 4,836,398 A | 6/1989 | Leftault, Jr. et al. | |
| 4,840,289 A | 6/1989 | Fait et al. | |
| 4,850,493 A | 7/1989 | Howard, Jr. | |
| 4,850,494 A | 7/1989 | Howard, Jr. | |
| 4,865,206 A | 9/1989 | Behm et al. | |
| 4,867,323 A | 9/1989 | Powers | |
| 4,880,129 A | 11/1989 | McHenry et al. | |
| 4,887,730 A | 12/1989 | Touzani | |
| 4,892,205 A | 1/1990 | Powers et al. | |
| 4,896,205 A | 1/1990 | Weber | |
| 4,921,147 A | 5/1990 | Poirier | |
| 4,927,679 A | 5/1990 | Beck | |
| 4,962,863 A | 10/1990 | Wendling et al. | |
| 4,967,538 A * | 11/1990 | Leftault et al. | 53/440 |
| 4,978,015 A | 12/1990 | Walker | |
| 4,997,692 A | 3/1991 | Yoshino | |
| 5,004,109 A | 4/1991 | Bartley et al. | |
| 5,005,716 A | 4/1991 | Eberle | |
| 5,014,868 A | 5/1991 | Wittig et al. | |
| 5,020,691 A | 6/1991 | Nye | |
| 5,024,340 A | 6/1991 | Alberghini et al. | |
| 5,033,254 A | 7/1991 | Zenger | |
| 5,060,453 A | 10/1991 | Alberghini et al. | |
| 5,067,622 A | 11/1991 | Garver et al. | |
| 5,090,180 A | 2/1992 | Sorensen | |
| 5,092,474 A | 3/1992 | Leigner | |
| 5,122,327 A | 6/1992 | Spina et al. | |
| 5,133,468 A | 7/1992 | Brunson et al. | |
| 5,141,121 A | 8/1992 | Brown et al. | |
| 5,178,290 A | 1/1993 | Ota et al. | |
| 5,199,587 A | 4/1993 | Ota et al. | |
| 5,199,588 A | 4/1993 | Hayashi | |
| 5,201,438 A | 4/1993 | Norwood | |
| 5,217,737 A | 6/1993 | Gygax et al. | |
| 5,234,126 A | 8/1993 | Jonas et al. | |
| 5,244,106 A | 9/1993 | Takacs | |
| 5,251,424 A | 10/1993 | Zenger et al. | |
| 5,255,889 A | 10/1993 | Collette et al. | |
| 5,261,544 A | 11/1993 | Weaver, Jr. | |
| 5,279,433 A | 1/1994 | Krishnakumar et al. | |
| 5,281,387 A | 1/1994 | Collette et al. | |
| 5,310,043 A | 5/1994 | Alcorn | |
| 5,333,761 A | 8/1994 | Davis et al. | |
| 5,341,946 A | 8/1994 | Valliencourt et al. | |
| 5,392,937 A | 2/1995 | Prevot et al. | |
| 5,411,699 A | 5/1995 | Collette et al. | |
| 5,454,481 A | 10/1995 | Hsu | |
| 5,472,105 A | 12/1995 | Krishnakumar et al. | |
| 5,472,181 A | 12/1995 | Lowell | |
| RE35,140 E | 1/1996 | Powers, Jr. | |
| 5,484,052 A | 1/1996 | Pawloski et al. | |
| 5,503,283 A | 4/1996 | Semersky | |
| 5,543,107 A | 8/1996 | Malik et al. | |
| 5,593,063 A | 1/1997 | Claydon et al. | |
| 5,598,941 A | 2/1997 | Semersky et al. | |
| 5,632,397 A | 5/1997 | Fandeux et al. | |
| 5,642,826 A | 7/1997 | Melrose | |
| 5,672,730 A | 9/1997 | Cottman | |
| 5,687,874 A | 11/1997 | Omori et al. | |
| 5,690,244 A | 11/1997 | Darr | |
| 5,704,504 A | 1/1998 | Bueno | |
| 5,713,480 A | 2/1998 | Petre et al. | |
| 5,730,314 A | 3/1998 | Wiemann et al. | |
| 5,730,914 A | 3/1998 | Ruppmann, Sr. | |
| 5,735,420 A | 4/1998 | Nakamaki et al. | |
| 5,737,827 A | 4/1998 | Kuse et al. | |
| 5,758,802 A | 6/1998 | Wallays | |
| 5,762,221 A | 6/1998 | Tobias et al. | |
| 5,780,130 A | 7/1998 | Hansen et al. | |
| 5,785,197 A | 7/1998 | Slat | |
| 5,819,507 A | 10/1998 | Kaneko et al. | |
| 5,829,614 A | 11/1998 | Collette et al. | |
| 5,860,556 A | 1/1999 | Robbins, III | |
| 5,887,739 A | 3/1999 | Prevot et al. | |
| 5,888,598 A | 3/1999 | Brewster et al. | |
| 5,897,090 A | 4/1999 | Smith et al. | |
| 5,906,286 A | 5/1999 | Matsuno et al. | |
| 5,908,128 A | 6/1999 | Krishnakumar et al. | |
| D415,030 S | 10/1999 | Searle et al. | |
| 5,971,184 A | 10/1999 | Krishnakumar et al. | |

(56) References Cited

U.S. PATENT DOCUMENTS

| | | | |
|---|---|---|---|
| 5,976,653 A | 11/1999 | Collette et al. | |
| 5,989,661 A | 11/1999 | Krishnakumar et al. | |
| RE36,639 E | 4/2000 | Okhai | |
| 6,051,295 A | 4/2000 | Schloss et al. | |
| 6,063,325 A | 5/2000 | Nahill et al. | |
| 6,065,624 A | 5/2000 | Steinke | |
| 6,068,110 A | 5/2000 | Kumakiri et al. | |
| 6,074,596 A | 6/2000 | Jacquet | |
| 6,077,554 A | 6/2000 | Wiemann et al. | |
| 6,105,815 A | 8/2000 | Mazda | |
| 6,113,377 A | 9/2000 | Clark | |
| 6,176,382 B1 * | 1/2001 | Bazlur Rashid | 215/373 |
| 6,213,325 B1 | 4/2001 | Cheng et al. | |
| 6,217,818 B1 | 4/2001 | Collette et al. | |
| 6,228,317 B1 | 5/2001 | Smith et al. | |
| 6,230,912 B1 | 5/2001 | Rashid | |
| 6,248,413 B1 | 6/2001 | Barel et al. | |
| 6,277,321 B1 | 8/2001 | Vailliencourt et al. | |
| 6,298,638 B1 | 10/2001 | Bettle | |
| 6,375,025 B1 | 4/2002 | Mooney | |
| 6,390,316 B1 | 5/2002 | Mooney | |
| 6,413,466 B1 | 7/2002 | Boyd et al. | |
| 6,439,413 B1 | 8/2002 | Prevot et al. | |
| 6,467,639 B2 | 10/2002 | Mooney | |
| 6,485,669 B1 | 11/2002 | Boyd et al. | |
| 6,502,369 B1 | 1/2003 | Andison et al. | |
| 6,514,451 B1 | 2/2003 | Boyd et al. | |
| 6,585,124 B2 | 7/2003 | Boyd et al. | |
| 6,595,380 B2 | 7/2003 | Silvers | |
| 6,612,451 B2 | 9/2003 | Tobias et al. | |
| 6,662,960 B2 | 12/2003 | Hong et al. | |
| 6,676,883 B2 | 1/2004 | Hutchinson et al. | |
| 6,749,780 B2 | 6/2004 | Tobias | |
| 6,763,968 B1 | 7/2004 | Boyd et al. | |
| 6,769,561 B2 | 8/2004 | Futral et al. | |
| 6,779,673 B2 | 8/2004 | Melrose et al. | |
| 6,923,334 B2 | 8/2005 | Melrose et al. | |
| 6,942,116 B2 | 9/2005 | Lisch et al. | |
| 6,983,858 B2 | 1/2006 | Slat et al. | |
| 7,051,073 B1 | 5/2006 | Dutta | |
| 7,051,889 B2 | 5/2006 | Boukobza | |
| D522,368 S | 6/2006 | Darr et al. | |
| 7,073,675 B2 | 7/2006 | Trude | |
| 7,077,279 B2 | 7/2006 | Melrose | |
| 7,080,747 B2 | 7/2006 | Lane et al. | |
| 7,137,520 B1 | 11/2006 | Melrose | |
| 7,150,372 B2 | 12/2006 | Lisch et al. | |
| 7,159,374 B2 | 1/2007 | Abercrombie, III et al. | |
| 7,350,657 B2 | 4/2008 | Eaton et al. | |
| 7,543,713 B2 | 6/2009 | Trude et al. | |
| 7,735,304 B2 | 6/2010 | Kelley et al. | |
| 7,799,264 B2 | 9/2010 | Trude | |
| 7,900,425 B2 | 3/2011 | Bysick et al. | |
| 2001/0035391 A1 | 11/2001 | Young et al. | |
| 2002/0074336 A1 | 6/2002 | Silvers | |
| 2002/0096486 A1 | 7/2002 | Bourque et al. | |
| 2002/0153343 A1 | 10/2002 | Tobias | |
| 2002/0158038 A1 | 10/2002 | Heisel et al. | |
| 2003/0015491 A1 | 1/2003 | Melrose et al. | |
| 2003/0186006 A1 | 10/2003 | Schmidt et al. | |
| 2003/0196926 A1 | 10/2003 | Tobias et al. | |
| 2003/0217947 A1 | 11/2003 | Ishikawa et al. | |
| 2004/0000533 A1 | 1/2004 | Kamineni et al. | |
| 2004/0016716 A1 | 1/2004 | Melrose et al. | |
| 2004/0074864 A1 | 4/2004 | Melrose et al. | |
| 2004/0149677 A1 | 8/2004 | Slat et al. | |
| 2004/0173565 A1 | 9/2004 | Semersky et al. | |
| 2004/0211746 A1 | 10/2004 | Trude | |
| 2004/0232103 A1 * | 11/2004 | Lisch et al. | 215/374 |
| 2005/0211662 A1 | 9/2005 | Eaton et al. | |
| 2005/0218108 A1 | 10/2005 | Bangi et al. | |
| 2006/0006133 A1 | 1/2006 | Lisch et al. | |
| 2006/0138074 A1 | 6/2006 | Melrose | |
| 2006/0231985 A1 * | 10/2006 | Kelley | 264/523 |
| 2006/0243698 A1 | 11/2006 | Melrose | |
| 2006/0255005 A1 | 11/2006 | Melrose et al. | |
| 2006/0261031 A1 | 11/2006 | Melrose | |
| 2007/0017892 A1 | 1/2007 | Melrose | |
| 2007/0045312 A1 | 3/2007 | Abercrombie, III et al. | |
| 2007/0051073 A1 | 3/2007 | Kelley et al. | |
| 2007/0084821 A1 | 4/2007 | Bysick et al. | |
| 2007/0125742 A1 | 6/2007 | Simpson, Jr. et al. | |
| 2007/0125743 A1 | 6/2007 | Pritchett, Jr. et al. | |
| 2007/0181403 A1 | 8/2007 | Sheets et al. | |
| 2007/0199915 A1 | 8/2007 | Denner et al. | |
| 2007/0199916 A1 | 8/2007 | Denner et al. | |
| 2007/0215571 A1 * | 9/2007 | Trude | 215/373 |
| 2007/0235905 A1 | 10/2007 | Trude et al. | |
| 2008/0047964 A1 | 2/2008 | Denner et al. | |
| 2008/0156847 A1 | 7/2008 | Hawk et al. | |
| 2009/0202766 A1 | 8/2009 | Beuerle et al. | |
| 2009/0293436 A1 | 12/2009 | Miyazaki et al. | |
| 2011/0210133 A1 | 9/2011 | Melrose et al. | |

FOREIGN PATENT DOCUMENTS

| | | |
|---|---|---|
| DE | 1761753 | 1/1972 |
| DE | P2102319.8 | 8/1972 |
| DE | 3215866 A1 | 11/1983 |
| EP | 225155 A2 | 6/1987 |
| EP | 346518 A1 | 12/1989 |
| EP | 0551788 A1 | 7/1993 |
| EP | 0666222 A1 | 2/1994 |
| EP | 0521624 B1 | 12/1996 |
| EP | 0609348 B1 | 2/1997 |
| EP | 0916406 A2 | 5/1999 |
| EP | 0957030 A2 | 11/1999 |
| EP | 1063076 | 12/2000 |
| EP | 1063076 A1 | 12/2000 |
| FR | 1571499 | 6/1969 |
| FR | 2607109 | 5/1988 |
| GB | 781103 | 8/1957 |
| GB | 1113988 | 5/1968 |
| GB | 2050919 A | 1/1981 |
| GB | 2372977 A | 9/2002 |
| JP | 48-31050 | 9/1973 |
| JP | 49-28628 | 7/1974 |
| JP | 54-72181 A | 6/1979 |
| JP | 56-72730 U | 6/1981 |
| JP | 54-070185 | 1/1982 |
| JP | 57-210829 A | 1/1982 |
| JP | 57-37827 U | 2/1982 |
| JP | 57-0177730 | 2/1982 |
| JP | 63-189224 A | 8/1988 |
| JP | 57-126310 | 2/1989 |
| JP | 3-43342 A | 2/1991 |
| JP | 03-076625 A | 4/1991 |
| JP | 5-193694 | 8/1993 |
| JP | 6-336238 A | 12/1994 |
| JP | 07-300121 A | 11/1995 |
| JP | 8-253220 A | 10/1996 |
| JP | 09 001639 | 1/1997 |
| JP | 09-039934 A | 2/1997 |
| JP | 9-110045 A | 4/1997 |
| JP | 10-167226 A | 6/1998 |
| JP | 10-181734 A | 7/1998 |
| JP | 10-230919 A | 9/1998 |
| JP | 3056271 | 11/1998 |
| JP | 2000-229615 | 8/2000 |
| JP | 2002-127237 A | 5/2002 |
| JP | 2004-026307 A | 1/2004 |
| JP | 2006-501109 | 1/2006 |
| JP | 2007-216981 A | 8/2007 |
| JP | 2008 189721 | 8/2008 |
| NZ | 240448 | 6/1995 |
| NZ | 296014 | 10/1998 |
| NZ | 335565 | 10/1999 |
| NZ | 506684 | 9/2001 |
| NZ | 512423 | 9/2001 |
| NZ | 521694 | 10/2003 |
| WO | WO 93/09031 A1 | 5/1993 |
| WO | WO 93/12975 A1 | 7/1993 |
| WO | 94/06617 | 3/1994 |
| WO | WO 94/05555 | 3/1994 |

(56) References Cited

FOREIGN PATENT DOCUMENTS

| WO | WO 97/03885 | | 2/1997 |
| WO | WO 97/14617 | | 4/1997 |
| WO | WO 97/34808 | A1 | 9/1997 |
| WO | WO 99/21770 | | 5/1999 |
| WO | WO 00/38902 | A1 | 7/2000 |
| WO | WO 00/51895 | A1 | 9/2000 |
| WO | WO 01/40081 | A1 | 6/2001 |
| WO | WO 02/02418 | A1 | 1/2002 |
| WO | WO 02/18213 | A1 | 3/2002 |
| WO | WO 02/085755 | A1 | 10/2002 |
| WO | WO 2004/028910 | A1 | 4/2004 |
| WO | WO 2004/106176 | A2 | 9/2004 |
| WO | WO 2004/106175 | A1 | 12/2004 |
| WO | WO 2005/012091 | A2 | 2/2005 |
| WO | WO 2005/087628 | A1 | 9/2005 |
| WO | WO 2006/113428 | A2 | 10/2006 |
| WO | WO 2007/047574 | A1 | 4/2007 |
| WO | WO 2007/127337 | A2 | 11/2007 |

OTHER PUBLICATIONS

International Search Report for PCT/US06/40361 dated Feb. 26, 2007.
IPRP (including Written Opinion) for PCT/US2006/040361 dated Apr. 16, 2008.
International Search Report for PCT/US2004/016405 dated Feb. 15, 2005.
IPRP (including Written Opinion) for PCT/US2004/016405 dated Nov. 25, 2005.
"Application and Development of PET Plastic Bottle," Publication of Tsinghad Tongfang Optical Disc Co. Ltd., Issue 4, 2000, p. 41. (No English language translation available).
Manas Chanda & Salil K. Roy, Plastics Technology Handbook, Fourth Edition, 2007 CRC Press, Taylor & Francis Group, pp. 2-34-2-37.

\* cited by examiner

METHOD OF MAKING PLASTIC CONTAINER HAVING A DEEP-INSET BASE

BACKGROUND OF THE INVENTION

1. Field of the Invention

This invention relates generally to the design and manufacture of plastic containers, particularly plastic containers that are made by the reheat stretch blow molding process.

2. Description of the Related Technology

Plastic containers for packaging beverages are commonly fabricated from polyesters such as polyethylene terephthalate (PET). PET containers are lightweight, inexpensive, and recyclable and can be economically manufactured in large quantities.

PET containers are typically manufactured using the stretch blow molding process. This involves the use of a preform that is injection molded into a shape that facilitates distribution of the plastic material within the preform into the desired final shape of the container. The preform is first heated and then is longitudinally stretched and subsequently inflated within a mold cavity so that it assumes the desired final shape of the container. As the preform is inflated, it takes on the shape of the mold cavity. The polymer solidifies after contacting the cooler surface of the mold, and the finished hollow container is subsequently ejected from the mold.

PET containers are common for use in packaging beverages such as juices using what is known in the industry as the hot-fill process. This involves filling the containers while the liquid product is at an elevated temperature, typically 68° C.-96° C. (155° F.-205° F.) and usually about 85° C. (185° F.) in order to sterilize the container at the time of filling. Containers that are designed to withstand the process are known as "hot fill" type containers. After filling, such containers undergo significant volumetric shrinkage as a result of the cooling of the product within the sealed container. Hot fill type containers accordingly must be designed to have the capability of accommodating such shrinkage. Typically this has been done by incorporating one or more concave vacuum panels into the side wall of the container that are designed to flex inwardly as the volume of the product within the container decreases as a result of cooling. More recently, it has been proposed to accommodate such volumetric shrinkage by providing a movable vacuum panel in the bottom of the container.

In some instances, it is desirable for a plastic container to be formed with a deep inset base, i.e. a base that is shaped to have a relatively tall and narrow standing ring. A deep inset base may be desirable for any one of a number of different reasons, including but not limited to the placement of a movable vacuum panel in the bottom of the container. For example, a manufacturer may desire to place an article in the space that is defined by the container bottom, or a deep inset base may be desirable in order to provide stackability of the containers with respect to each other.

Unfortunately, it has been problematic in the past to manufacture a container having a deep inset base using the reheat stretch blowmolding process. Efforts to produce such containers often resulted in unwanted extreme stretching and thinning of the container wall in the area of the standing ring of the container base, crimping or folding of the standing ring, or other unwanted deformities in the bottom of the container. These problems made it practically impossible to effectively for a container having a deep inset base. A need exists for an improved container having a deep inset base and an improved method for manufacturing such a container.

SUMMARY OF THE INVENTION

Accordingly, it is an object of the invention to provide an improved container having a deep inset base and an improved method for manufacturing such a container.

In order to achieve the above and other objects of the invention, a method of making a plastic container that has a standing ring for supporting the container on a flat surface and a recessed base portion, according to a first aspect of the invention, includes steps of molding a container blank having a standing ring and a base projection portion that is formed beneath the standing ring; and relatively displacing the base projection portion upwardly with respect to the standing ring until the base projection portion is positioned above the standing ring.

According to a second aspect of the invention, a method of making a plastic container that has a standing ring for supporting the container on a flat surface and a recessed base portion includes steps of applying a pressurization to a plastic preform that is positioned within a mold assembly to mold from the preform a container blank having a standing ring and a base projection portion that is formed beneath the standing ring; and relatively displacing the base projection portion upwardly with respect to the standing ring until the base projection portion is positioned above the standing ring, and wherein the step of relatively displacing the base projection portion is initiated while the container blank remains pressurized.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
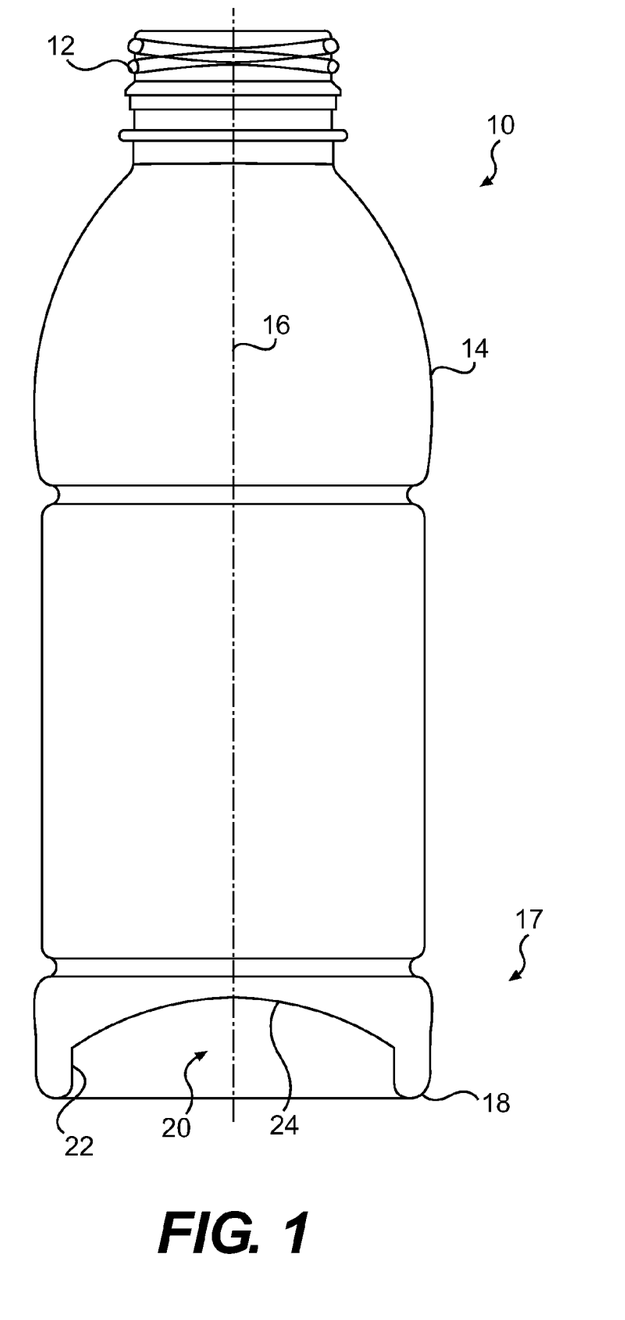
FIG. 1 is a diagrammatical view depicting a container that is made according to a first preferred embodiment of the invention in vertical cross-section.

Referring now to the drawings, wherein like reference numerals designate corresponding structure throughout the views, and referring in particular to FIG. 1, a plastic container 10 that is constructed according to a first preferred embodiment of the invention is preferably fabricated using the well-known reheat stretch blow molding process out of a material such as PET.

Plastic container 10 includes a threaded finish portion 12 to which a closure may be attached in conventional fashion, a main body portion 14 that is preferably substantially symmetrical about a vertical axis 16 and a container bottom 17 that is shaped so as to define a standing ring 18 for supporting the container 10 on a relatively flat underlying surface. In the preferred embodiment, the standing ring 18 is constructed as a continuous annular surface, but could alternatively be constructed as a plurality of downwardly depending feet, each having a lower surface for supporting the container 10 on an underlying surface.

Figure 4:
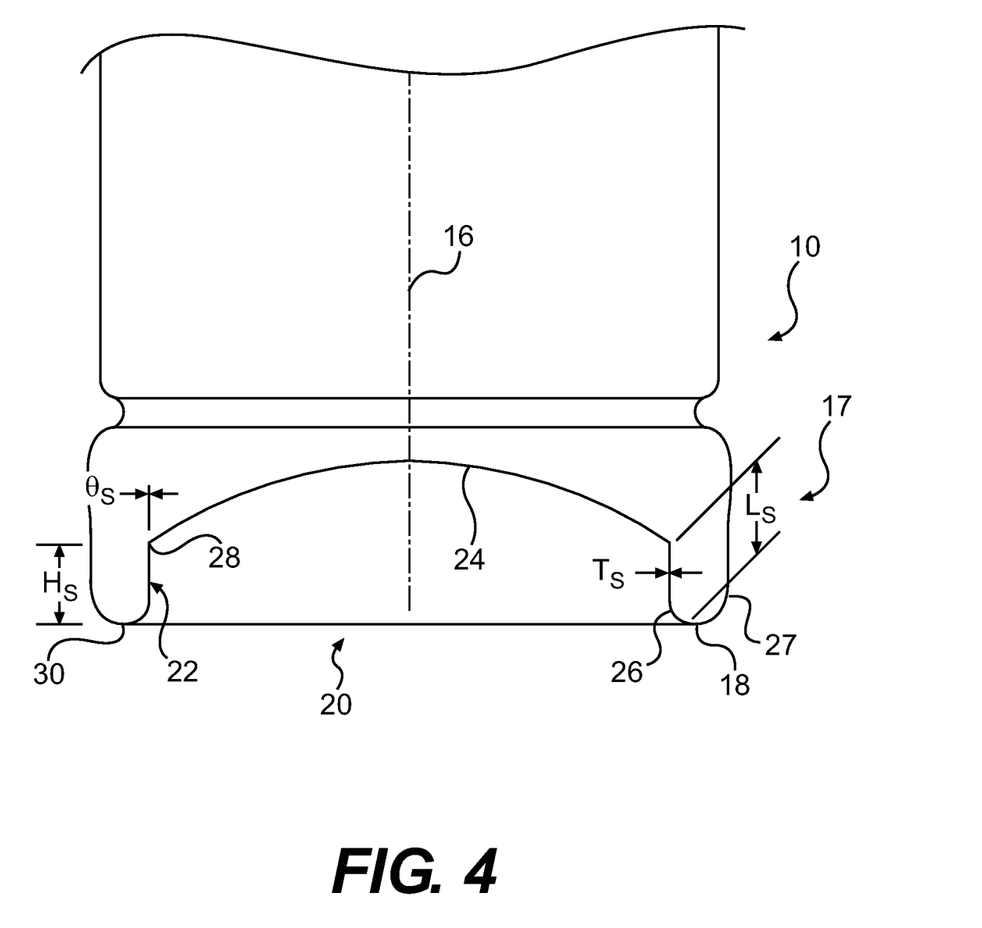
FIG. 4 is an enlarged view of a portion of the article that is depicted in FIG. 1.

As is best shown in FIG. 4, the container bottom 17 includes a central push-up area 20 that is positioned radially inwardly of the standing ring 18 so as to form a deep inset recessed base portion having relatively tall and narrow profile immediately above the standing ring 18.

The central push-up area 20 is defined in part by an upstanding container bottom sidewall portion 22 that in the preferred embodiment defines a continuous inwardly facing annular ring. The upstanding container bottom sidewall portion 22 is preferably although not necessarily substantially smooth and preferably includes a substantially linear portion when viewed in longitudinal cross-section. It may have a plurality of spaced ribs or grooves, which preferably are longitudinally or vertically oriented, which facilitate separation from the blow mold cavity wall.

The central push-up area 20 is also defined in part by a central portion 24, which may be shaped conventionally according to any one of a number of known configurations, the details of which are not essential to a full understanding of the invention.

Preferably, the upstanding container bottom sidewall portion 22 has a height $H_S$ as measured parallel to a longitudinal axis 16 of the container that is greater than about 0.35 inch, and that is more preferably within a range of about 0.35 inch to about 1.2 inch. The substantially smooth upstanding container bottom sidewall portion 22 also has a length $L_S$ that is defined as the surface distance between a top portion 28 and a bottom portion 30 as viewed in vertical cross-section as shown in FIG. 4. Preferably, the length $L_S$ is within a range of about 100% to about 115% of the height $H_S$.

Preferably, the upstanding container bottom sidewall portion 22 is immediately adjacent to the standing ring 18 of the container 10. In the preferred embodiment, the upstanding container bottom sidewall portion 22 is unitary at its lowermost end with the surface that defines the standing ring 18 of the container 10. Standing ring is this context is defined as the lowermost surface of the container 10 that contacts an underlying flat horizontal surface when the container 10 is placed thereon.

Looking again to FIG. 4, it will be seen that the upstanding container bottom sidewall portion 22 includes a substantially straight portion 26 that is angled with respect to a vertical plane that is parallel to the vertical axis 16 of the container 10 at an angle $\Theta_S$ that is preferably within a range of about 0° to about 15°. In the embodiment of FIG. 4, angle $\Theta_S$ is shown as about 0°.

The substantially straight portion 26 is also preferably substantially parallel to a substantially straight portion 27 of an outer sidewall of the container bottom 17, which facilitates the formation of a deep inset base having a relatively tall narrow standing ring. "Substantially parallel" for purposes of this feature is defined as within an angle range of about 0° to about 20°.

Preferably, the substantially smooth upstanding container bottom sidewall portion 22 has an average wall thickness $T_S$ that is within a range of about 0.018 inch to about 0.011 inch, and that is most preferably about 0.014 inch.

Figure 5:
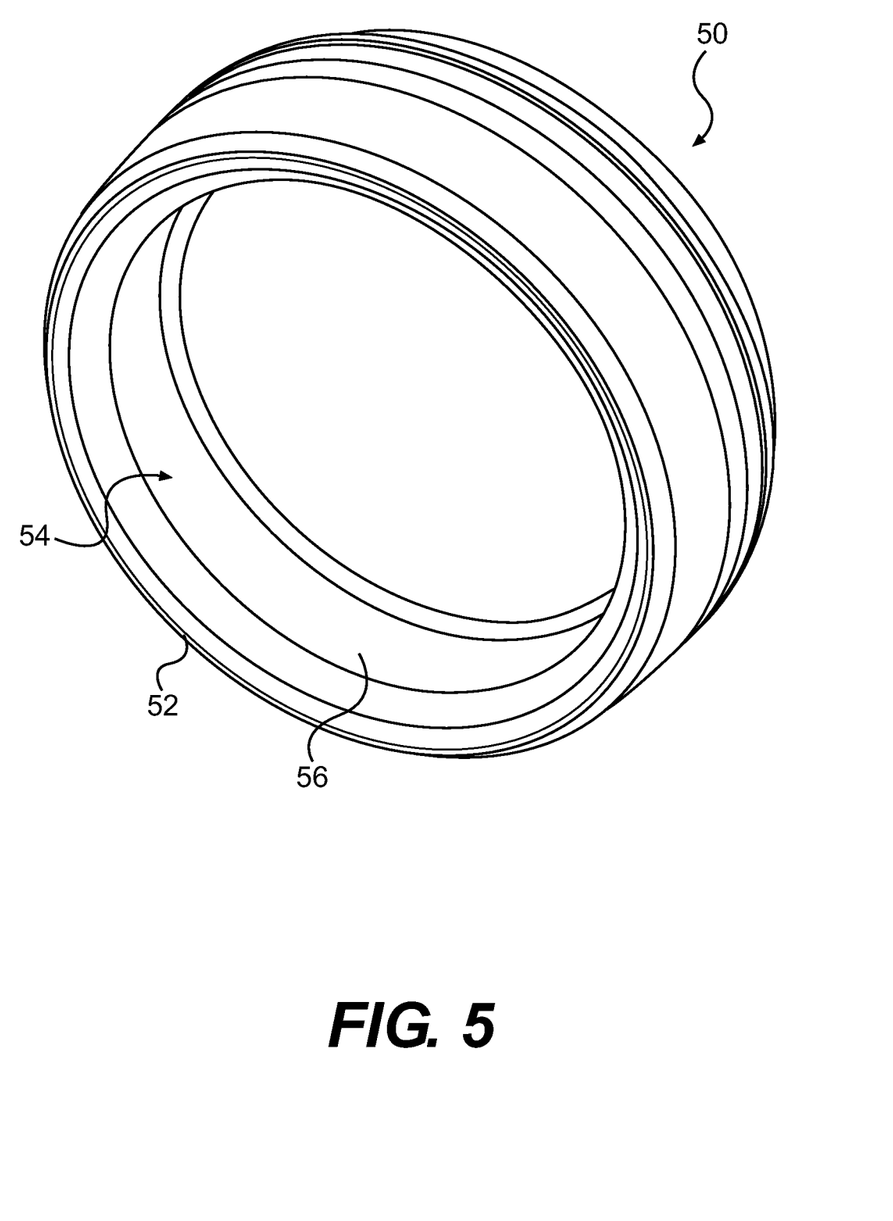
FIG. 5 is a fragmentary perspective view of a container bottom according to one embodiment of the invention.

FIG. 5 depicts a container bottom 50 that is made according to one embodiment of the invention, showing the deep inset base. Container bottom 50 includes a relatively, tall, narrow standing ring 52 and a central push-up area 54 that includes a substantially smooth upstanding container bottom sidewall portion 56.

Figure 2:
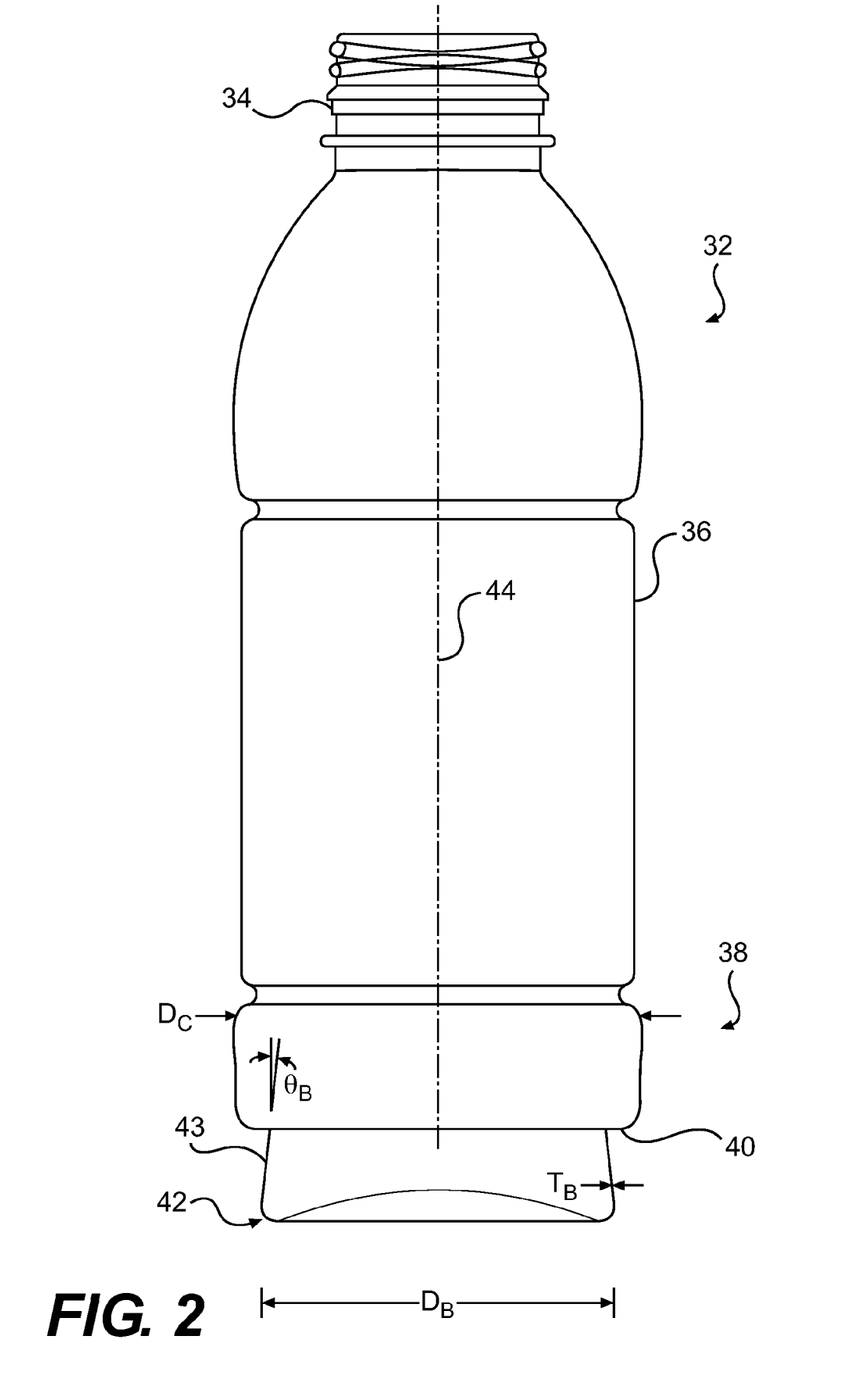
FIG. 2 is a side elevational view depicting an intermediate container blank according to an alternative preferred embodiment of the invention.

A method of making a plastic container according to a preferred embodiment of the invention includes steps of molding a container blank having a standing ring and a base projection portion that is formed beneath the standing ring and relatively displacing the base projection portion upwardly with respect to the standing ring until the base projection portion is positioned above the standing ring. A container blank 32 according to a preferred embodiment of the invention is shown in FIGS. 2 and 3.

Container blank 32 includes a threaded finish portion 34, a main body portion 36 and a container blank bottom 38 that defines a standing ring 40 and a downwardly depending base projection portion 42 that is formed beneath the standing ring 40. As FIGS. 2 and 3 show, the base projection portion 42 is at least as wide at a bottom end thereof than at a top end thereof. Preferably, the base projection portion 42 is wider at a bottom end thereof than at a top end thereof, as is clearly shown in FIGS. 2 and 3. The main body portion 36 is preferably although not necessarily formed so as to be substantially symmetrical about a vertical axis 44.

Figure 3:
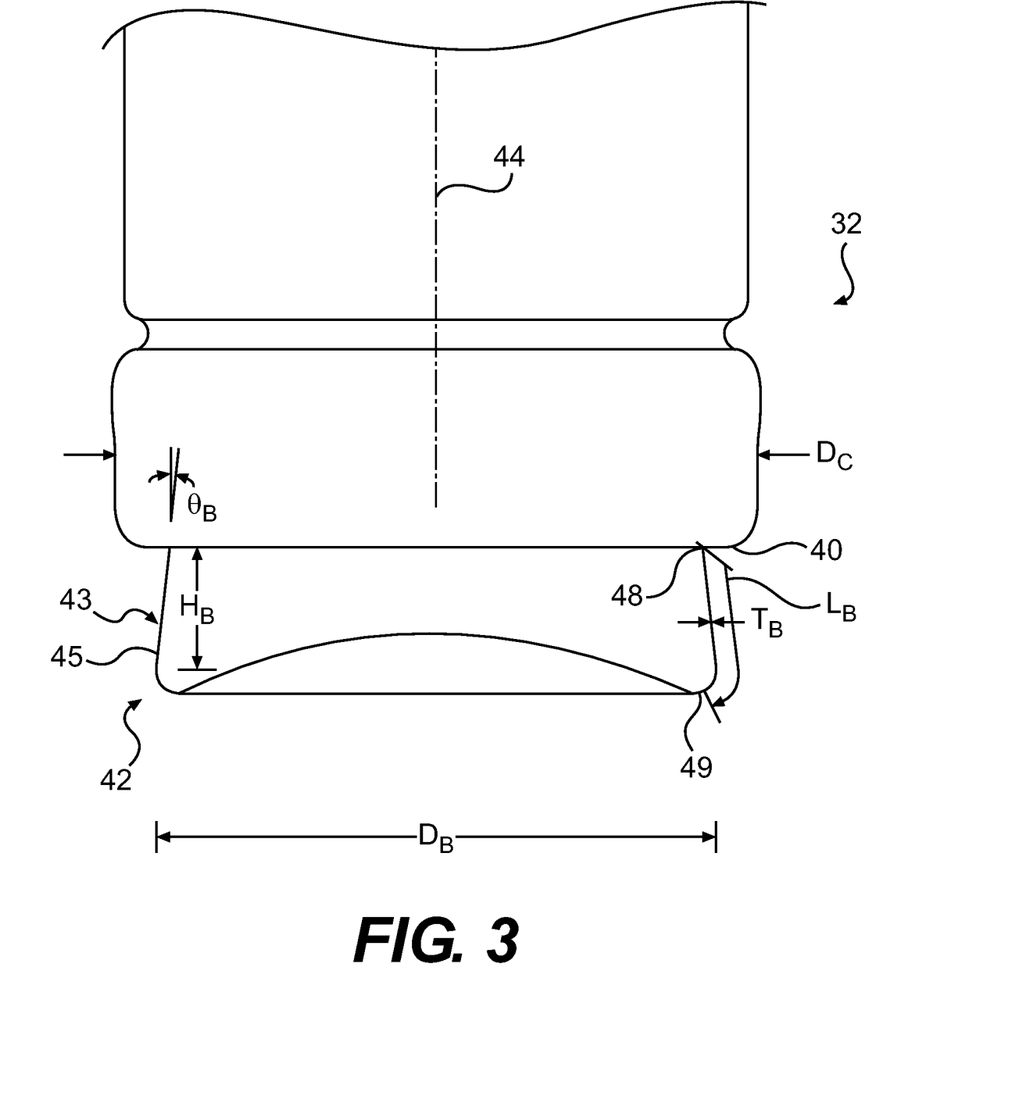
FIG. 3 is an enlarged view of a portion of the article that is depicted in FIG. 2.

As is best shown in FIG. 3, the base projection portion 42 includes an upstanding sidewall portion 43 that in the preferred embodiment forms the upstanding container bottom sidewall portion 22 shown in FIGS. 1 and 4 after the base projection portion 42 is relatively displaced and inverted with respect to the standing ring 40. Upstanding sidewall portion 43 is preferably although not necessarily substantially smooth, and may include a plurality of spaced vertically or longitudinally oriented ribs or grooves that aid in the separation of the base projection portion 42 from the blow mold cavity wall after molding.

The substantially smooth upstanding sidewall portion 43 preferably has an average wall thickness $T_B$ that is preferably within a range of about 0.018 inch to about 0.011 inch, and that is most preferably about 0.014 inch.

Preferably, the plastic container 10 that is made according to embodiment of the invention shown in FIG. 4 has a first maximum diameter $D_C$, and the base projection portion 42 has a second maximum diameter $D_B$, and the second maximum diameter $D_B$ is within a range of about 110% to about 80% of the first maximum diameter $D_C$. The second maximum diameter $D_B$ is preferably proximate to a bottom end of the base projection portion 42. Most preferably, the second maximum diameter $D_B$ is about 95% of the first maximum diameter $D_C$.

The substantially smooth upstanding sidewall portion 43 includes a substantially straight portion 45 on an outwardly facing surface thereof that, as shown in FIG. 3, forms most of the upstanding sidewall portion 43. The substantially straight portion 45 in the preferred embodiment is angled downwardly and outwardly with respect to a vertical plane as viewed in vertical or longitudinal cross-section as shown in FIG. 3. The substantially straight portion 45 is preferably symmetrically shaped about a circumference of the base projection portion 42 so as to define a substantially straight annular wall. The substantially straight portion as viewed in vertical or longitudinal cross-section preferably is substantially parallel to a longitudinal axis 44 of the container blank. Substantially parallel in this case is defined as being angled with respect to a vertical plane at an angle $\Theta_B$ that is within a range of about 0° to about 15°.

The substantially straight portion 45 has a height $H_B$ as measured parallel to a longitudinal axis 44 of the container blank that is preferably greater than about 0.3 inch. The substantially smooth upstanding sidewall portion 43 of the base projection portion 42 has a length $L_B$ measured, as is best shown in FIG. 3, along its curvature between a first, upper location 48 and a second, lower location 49. Preferably, the length $L_B$ is within a range of about 100% to about 115% of the height $H_B$.

Preferably, the length $L_B$ is also within a range of about 75% to about 115% of the height $H_S$ of the upstanding container bottom sidewall portion 22.

The inversion or relative displacement of the base projection portion as shown in FIG. 3 into the container bottom shown in FIG. 4 is preferably performed while the plastic material is still formable and stretchable. Accordingly, according to one embodiment of the invention the inversion process may be performed to elongate and stretch the length of the base projection portion so that the height $H_S$ of the container bottom is greater than the height $H_B$ of the base projection portion. The permits the formation of a deep inset base that is deeper than would otherwise be possible, and permits under some circumstances more optimal material distribution with the container base. Accordingly, it permits lightweighting of the container in order to minimize material costs.

Figure 6:
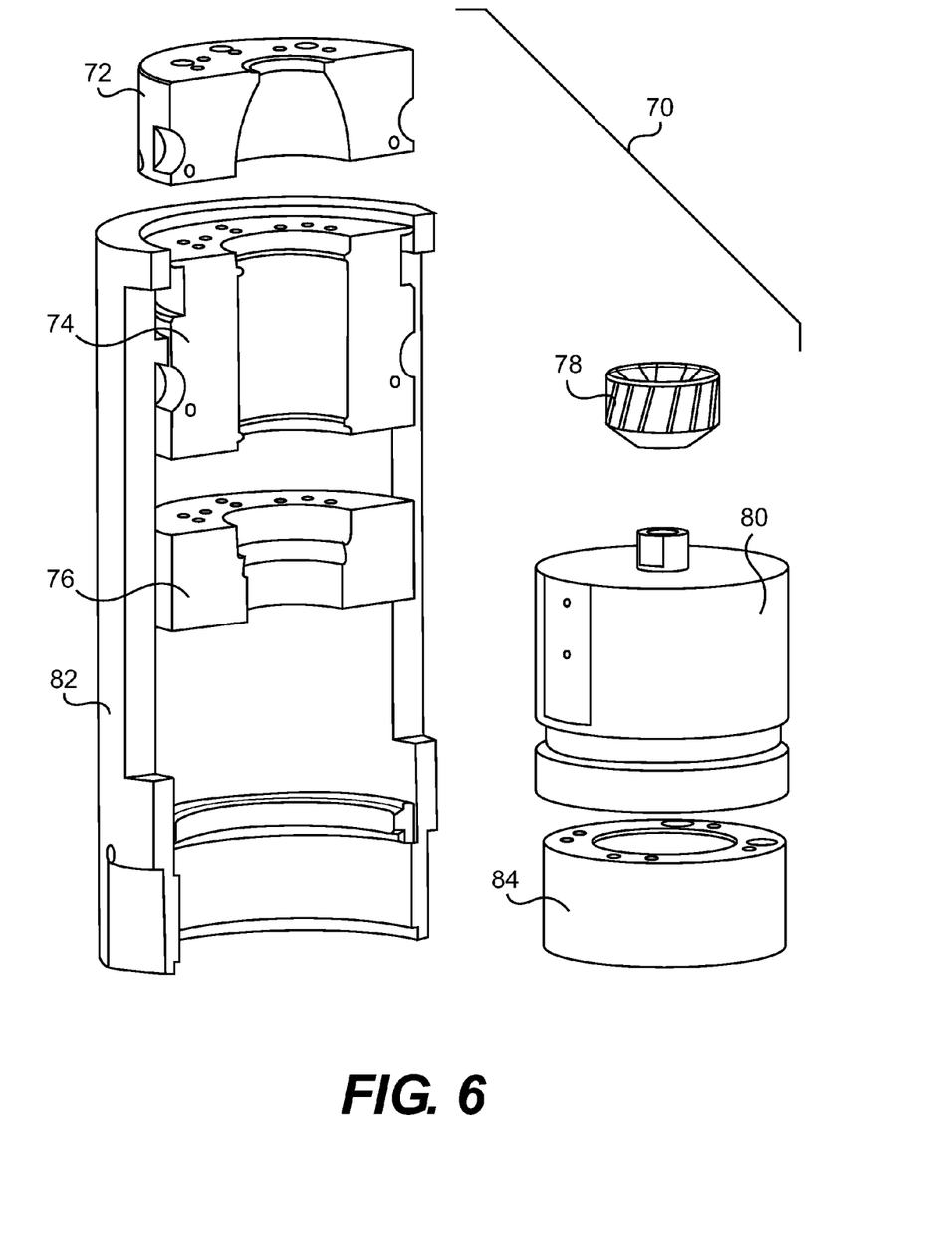
FIG. 6 is an exploded view of a mold assembly that is used to make a container according to a preferred embodiment of the invention.

FIG. 6 depicts a mold assembly 70 that is constructed according to a preferred embodiment of the invention for molding a container blank 32 and then relatively displacing or inverting the base projection portion 42 of the container blank 32 with respect to the standing ring 40 until the base projection portion 42 is positioned above the standing ring 40 in order to complete formation of a container 10.

Mold assembly 70 includes a first mold portion 72 that is shaped to define an upper portion of the main body 36 of the container blank 32. A second mold portion 74 is shaped to define the rest of the main body 36, while a third mold portion 76 is shaped to form portions of the container blank bottom 38 including the base projection portion 42. Actuator 80 is supported by a pedestal 84 that is received within the mold housing 82.

Figure 7:
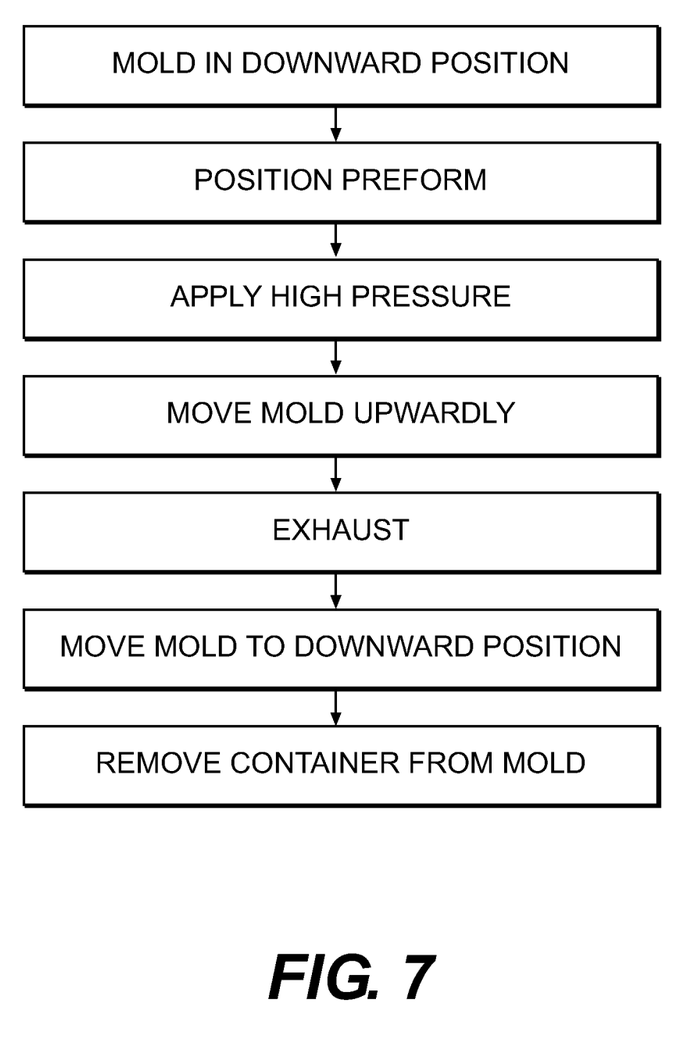
FIG. 7 is a flow chart depicting a method that is performed according to a preferred embodiment of the invention.

FIG. 7 is a flow chart depicting a preferred method for making a container according to one aspect of the invention.

In order to form a container blank 32, a heated plastic preform is positioned within the mold assembly 70 and the mold assembly is locked. The preform is then subjected to a pre-blow process in order to prevent the preform from collapsing on itself and is then longitudinally stretched using a stretch rod in otherwise conventional fashion in order to initiate the well-known reheat stretch blow molding process.

High pressure (typically on the order of 520-600 psi) is then applied to the interior of the preform with the mold surface 78 in the downward position in order to cause the plastic material from the preform to stretch and conform to the mold surfaces that are defined by the various above-described mold portions 72, 74, 76, 78. This forms the container blank 32.

After the container blank 32 has been formed, the actuator 80 will be instructed by a control system to displace the fourth movable mold portion 78 upwardly with respect to the mold portions 72, 74, 76 in order to upwardly displace and invert the base projection portion into its final position above the standing ring of the container. Effectively, the base projection portion 42 is inverted in order to form the deep inset base of the container that is depicted in FIG. 1, 4 or 5. This step is advantageously initiated while the high pressure is still being maintained within the container blank 32, before the pressurized gas is exhausted from the mold assembly.

Preferably, the level of pressurization within the container blank relative to ambient pressure at the time that the fourth movable mold portion 78 is moved upwardly is at least 50% of the maximum pressurization that occurs within the mold during the formation of the container blank 32.

The pressurization within the container blank relative to ambient pressure at the time that the fourth movable mold portion 78 is preferably at least 260 psi, relative to external ambient pressure. This will prevent crushing of the container sidewalls during the upward movement of the fourth movable mold portion 78.

In addition, the upward movement of the fourth movable mold portion 78 is preferably performed before substantial cooling of the base projection portion has occurred, and while the plastic material retains a substantial amount of stretchability and flexibility. Preferably, the upward movement of the fourth movable mold portion 78 takes places within about 10 seconds after the container blank 32 is formed.

As FIG. 7 shows, the stretch rod is retracted and the exhaust process is initiated while the fourth movable mold portion 78 is still in the upper position. The fourth movable mold portion 78 is then lowered, the mold is opened, and the container 10 is removed from the mold.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of making a plastic container having a deep inset base comprising steps of:

molding a plastic preform into an intermediate plastic container blank having a container bottom comprising a standing ring and a base projection portion formed beneath standing ring with the container blank in an upright position, the base projection portion having a lowermost end wider than an opposite end thereof, said opposite end being proximate to said standing ring, so that a substantially straight sidewall of the base projection portion is angled outwardly toward said lowermost end with respect to a longitudinal axis of the container blank, wherein a maximum diameter of the base projection portion is within a range of about 80% to about 110% of a maximum diameter of a remainder of the container blank; and relatively displacing the base projection portion upwardly with respect to the standing ring so as to convert the base projection portion into a central push-up area positioned inside the container bottom, the substantially straight sidewall of the base projection portion thereby forming an upstanding container bottom sidewall portion having an angle of about 0° with respect to said longitudinal axis.

2. A method of making a plastic container according to claim 1, wherein said upstanding container bottom sidewall portion has a height that is within a range of about 0.35 inch to about 1.2 inch.

3. A method of making a plastic container according to claim 1, wherein said upstanding container bottom sidewall portion defines a continuous, inwardly facing annular ring.

4. A method of making a plastic container according to claim 1, wherein said upstanding container bottom sidewall portion has an average wall thickness that is within a range of about 0.018 inch to about 0.011 inch.

5. A method of making a plastic container according to claim 4, wherein said average wall thickness is about 0.014 inch.

6. A method of making a plastic container according to claim 1, wherein said maximum diameter of the base projection portion is about 95% of said maximum diameter of the remaining container blank.

7. A method of making a plastic container according to claim 1, wherein said substantially straight sidewall is symmetrically shaped about a circumference of the base projection portion so as to define a substantially straight annular wall.

8. A method of making a plastic container according to claim 1, wherein said substantially straight sidewall has a length that is within a range of about 75% to about 115% of a height of said upstanding sidewall portion.

9. A method of making a plastic container according to claim 1, wherein said relative displacement stretches plastic material of said base projection portion.

10. A method of making a plastic container according to claim 1, wherein said molding comprises applying pressurization to said preform within a mold assembly, and wherein said relative displacement is initiated while the intermediate container blank remains pressurized relative to ambient pressure.

11. A method of making a plastic container according to claim 10, wherein said relative displacement stretches plastic material of said base projection portion.

12. A method of making a plastic container according to claim 10, wherein said remaining pressure is at least 50% of a maximum pressurization that occurs during said molding.

13. A method of making a plastic container according to claim 10, wherein said remaining pressure is at least 260 psi.

* * * * *